United States Patent
Wang

(10) Patent No.: US 8,050,031 B2
(45) Date of Patent: Nov. 1, 2011

(54) ELECTRONIC DEVICE WITH RETRACTABLE SUPPORT

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 178 days.

(21) Appl. No.: 12/508,591

(22) Filed: Jul. 24, 2009

(65) Prior Publication Data

US 2010/0232099 A1    Sep. 16, 2010

(30) Foreign Application Priority Data

Mar. 13, 2009    (CN) .......................... 2009 1 0300823

(51) Int. Cl.
- *G06F 1/16* (2006.01)
- *B41J 11/56* (2006.01)
- *F16M 11/00* (2006.01)

(52) U.S. Cl. .............. 361/679.59; 361/679.55; 400/681; 400/682; 248/677

(58) Field of Classification Search .......... 361/679.01–679.45, 679.55–679.59; 312/223.1, 223.2; 248/677; 400/681–682, 400/472

See application file for complete search history.

(56) References Cited

U.S. PATENT DOCUMENTS

| | | | | |
|---|---|---|---|---|
| 5,297,003 A * | 3/1994 | Nomura et al. | .......... | 361/679.12 |
| 5,818,690 A * | 10/1998 | Spencer | .................. | 361/679.09 |
| 6,097,592 A * | 8/2000 | Seo et al. | ................ | 361/679.55 |
| 6,097,595 A * | 8/2000 | Cipolla | .................... | 361/679.21 |
| 6,654,237 B1 * | 11/2003 | Lee | .......................... | 361/679.55 |
| 7,206,198 B2 * | 4/2007 | Wang | ...................... | 361/679.55 |
| 7,542,276 B2 * | 6/2009 | Chang | .................... | 361/679.59 |
| 7,746,636 B2 * | 6/2010 | Tang | ....................... | 361/679.55 |

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

An electronic device includes a main body, a cover, and two supports. The main body defines two receiving slots. The cover is hinged on the main body. Each support includes a supporting member and a driving member hinged on each other. The driving member is hinged on the main body, so that the supporting member of each support is capable of being fully received in the receiving slots or pushed out of the main body, in response of the positions of the cover.

11 Claims, 5 Drawing Sheets

ELECTRONIC DEVICE WITH RETRACTABLE SUPPORT

BACKGROUND

1. Technical Field

The present disclosure generally relates to electronic devices and, particularly, to an electronic device with a retractable support.

2. Description of Related Art

Notebook computers have become popular alternatives to desktop computers because of their portability. A typical notebook computer includes a display body and a main body with a keyboard. The display body is hinged on the main body so that the display body can be opened and closed relative to the main body. In most circumstances, a typical notebook computer is operated on a table or desktop. However, the keyboard on the main body is usually parallel to the tabletop making it uncomfortable to operate. In addition, a bottom face of the main body of the notebook computer is substantially entirely in contact with the tabletop. Heat produced by internal electronic components cannot be dispersed efficiently from the main body of the notebook, even though the notebook has a fan for heat dissipation. As a result, the internal electronic components may be damaged from overheating. Accordingly, a notebook computer which can solve the described limitations is needed.

One such notebook computer has a keyboard that pops up away from a main body of the notebook computer and angles relative to the main body so that it is more comfortable to operate. In addition, a gap for evacuating heat is formed between the keyboard and the main body.

However, dust and other contaminants may easily enter the main body through the gap and deposit on the internal electronic components, causing short circuit of the internal electronic components and making it difficult to fully disperse heat produced thereby.

Therefore, an electronic device which overcomes the described limitations is desirable.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTIONS

Figure 1:
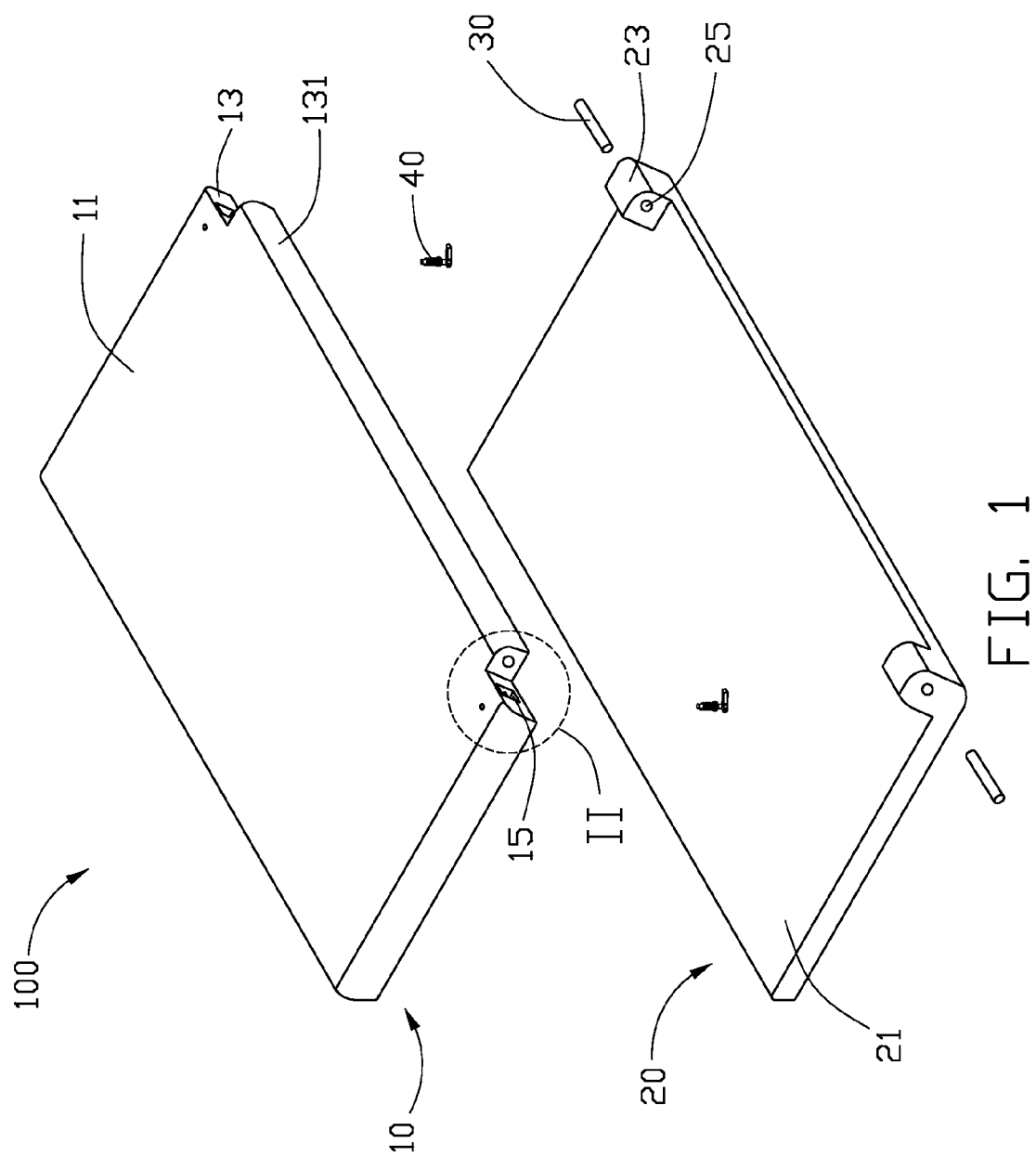
FIG. 1 is an exploded, isometric view of an embodiment of an electronic device, including supports.
Figure 2:
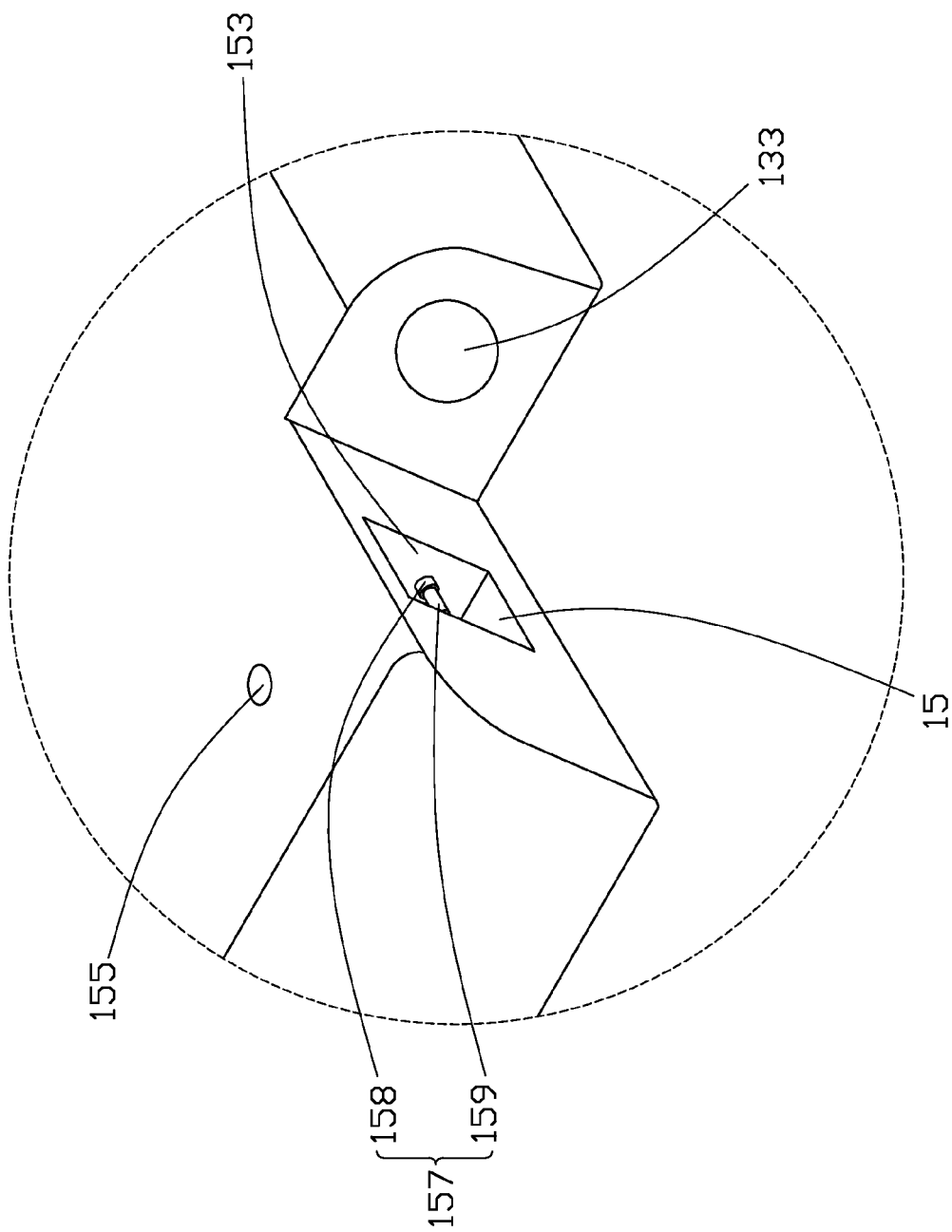
FIG. 2 is a an enlarged view of the region II of the electronic device of FIG. 1.

Referring to FIG. 1 and FIG. 2, an embodiment of an electronic device 100 includes a main body 10, a cover 20, two pivot shafts 30, and two supports 40. The cover 20 is hinged on the main body 10 via the pivot shafts 30. The supports 40 are positioned in the main body 10. In the illustrated embodiment, the electronic device 100 is a notebook computer. The electronic device 100 may include one or more pivot shafts 30, and one or more supports 40.

The main body 10 includes a bottom face 11 and a side surface 13 adjoining the bottom face 11. The main body 10 forms a connecting portion 131 protruding from the side surface 13. The connecting portion 131 defines two shaft holes 133 at two ends, respectively, receiving the pivot shafts 30. The main body 10 defines two receiving slots 15 adjacent to two ends of the connecting portion 131, respectively. A bottom wall 151 (shown in FIG. 4) and a plurality of sidewalls 153 adjoining the bottom wall 151 cooperatively defines the receiving slot 15. One of the sidewalls 153 defines a through hole 155 communicating with the receiving slot 15 and the bottom face 11. The main body 10 includes a rotating shaft 157. The rotating shaft 157 includes a first shaft portion 158 and a second shaft portion 159. The first shaft portion 158 has a diameter larger than that of the second shaft portion 159.

The cover 20 includes a bottom face 21 and forms two opposite resisting portions 23 on the bottom face 21. Each resisting portion 23 defines a pivot hole 25 receiving a corresponding pivot shaft 30. In the illustrated embodiment, the cover 20 is substantially rectangular.

Figure 3:
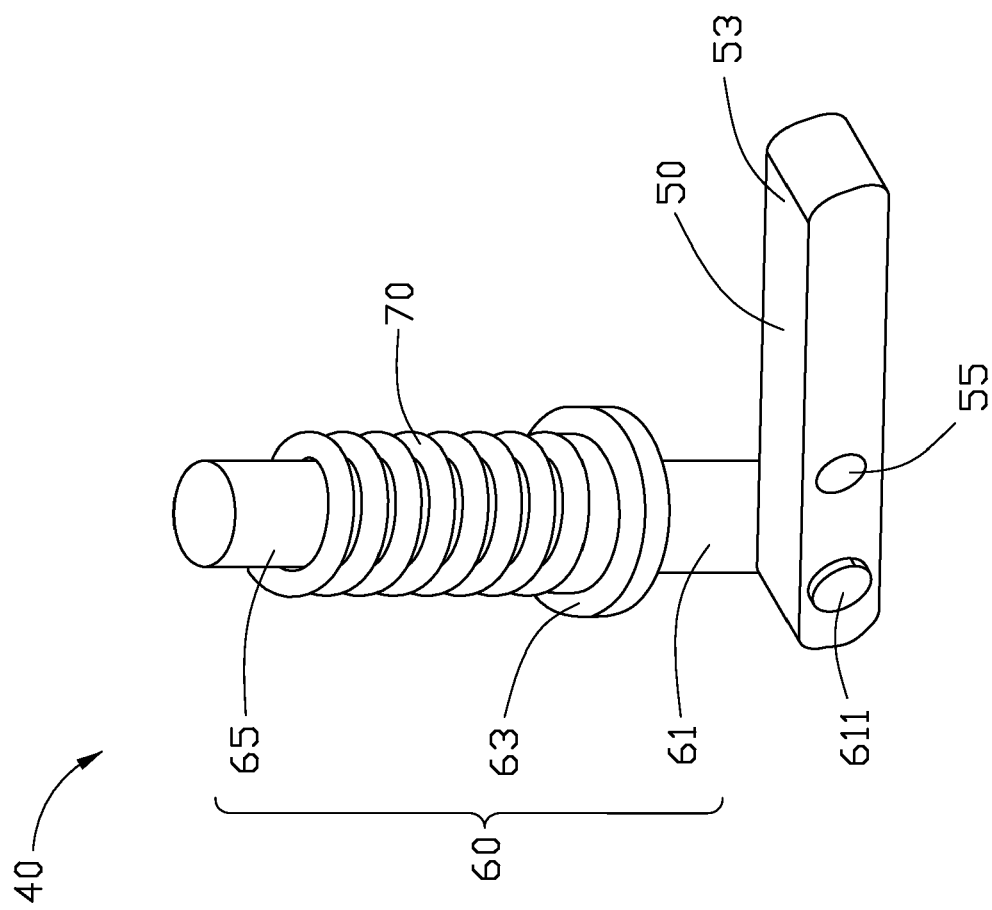
FIG. 3 is an isometric view of a support of the electronic device of FIG. 1.

Referring to FIG. 3, the support 40 includes a driving member 50, a supporting member 60, and an elastic member 70. The driving member 50 is a shaft including a resisting portion 53 at an end and defining a connecting hole (not shown) at an opposite end. The driving member 50 further defines a shaft hole 55 adjacent to the connecting hole to rotatably sleeve on the second shaft portion 159 of the rotating shaft 157 of the main body 10. The first shaft portion 158 protects the driving member 50 from collision with the sidewalls 153. The supporting member 60 includes a connecting portion 61, a limiting portion 63, and a supporting portion 65 arranged in that order. The connecting portion 61 includes a protrusion 611 to rotatably connect an end of the connecting portion 61 and an end of the driving member 50. The limiting portion 63 has a diameter larger than the supporting portion 65 to resist an end of the elastic member 70. The elastic member 70 is sleeved on the supporting portion 65 of the supporting member 60.

Referring to FIGS. 1 through 4, during assembly of the electronic device 100, each of the supports 40 is received in a corresponding receiving slot 15 via an opening of the slot opposite to the bottom wall 151, with the rotating shaft 157 rotatably engaged in the shaft hole 55 and an end of the supporting portion 65 of the supporting member 60 received in the through hole 155. Opposite ends of the elastic member 70 resist the limiting portion 63 and one of the sidewalls 153 correspondingly. Each of the pivot shafts 30 runs through the pivot hole 25 of one of the resisting portions 23 of the cover 20 and engages one of the shaft holes 133 of the main body 10 to rotatably connect the cover 20 to the main body 10. As such, the electronic device 100 is assembled.

Figure 4:
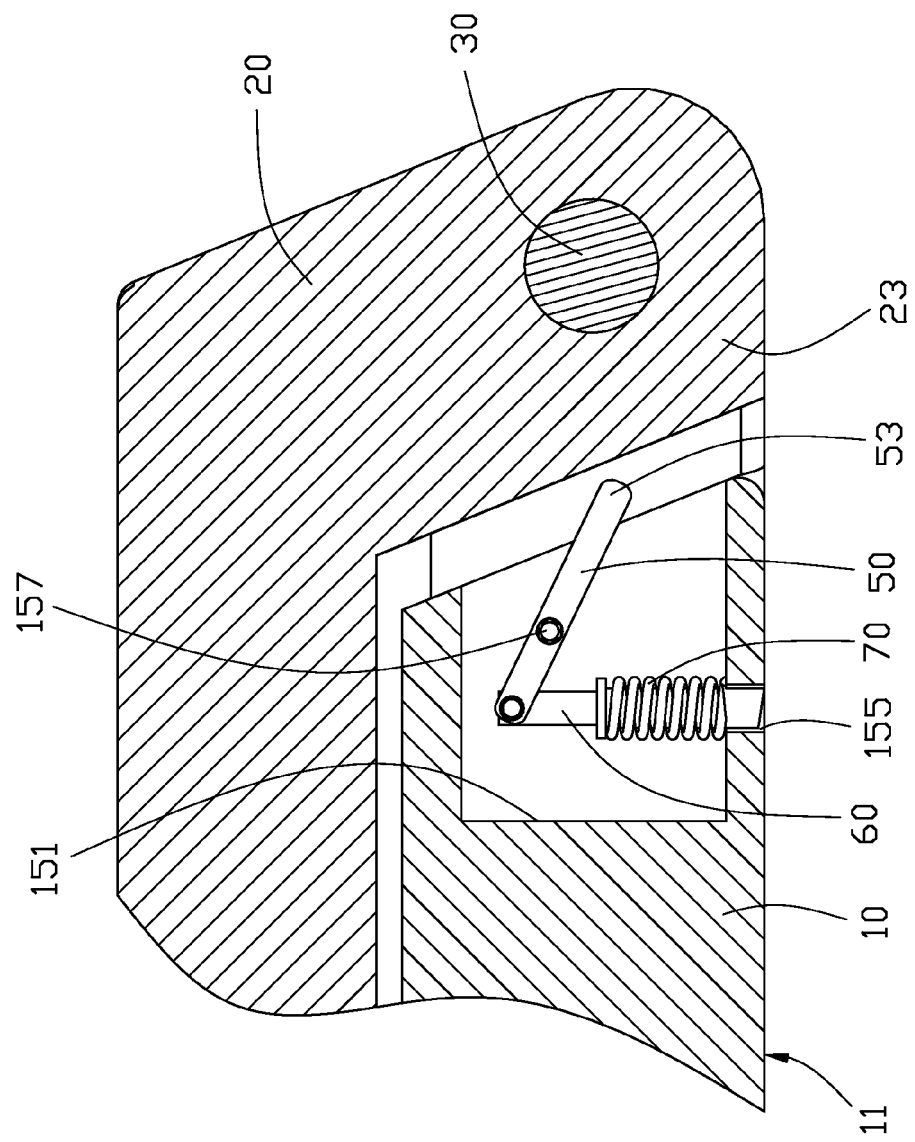
FIG. 4 is a partial, cross-sectional view of the electronic device of FIG. 1, showing a first state.
Figure 5:
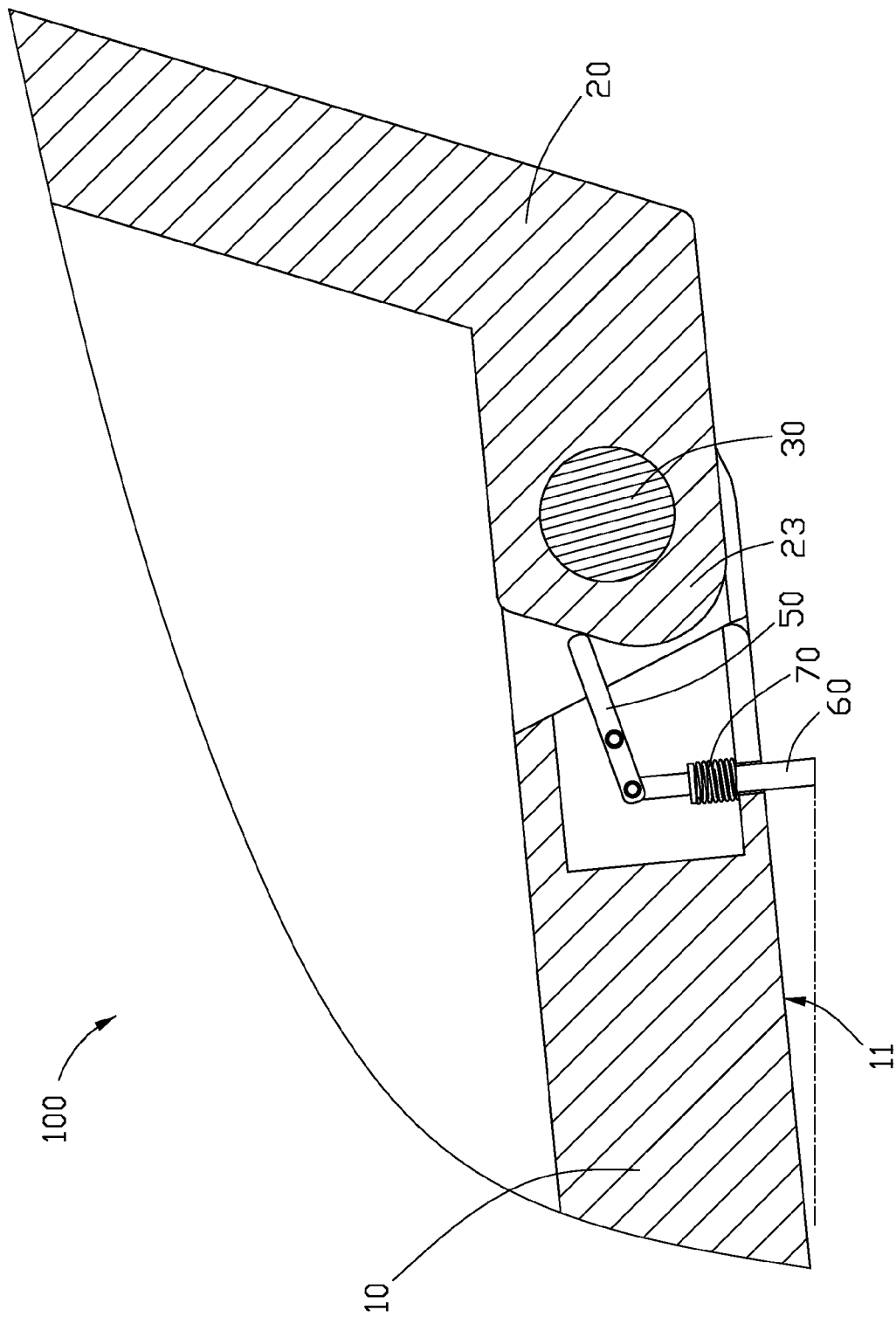
FIG. 5 is similar to FIG. 4, showing a second state.

Referring to FIGS. 4 and 5, when the electronic device 100 is in a first state, the supports 40 are entirely received in the receiving slots 15 and the through hole 155 and the electronic device 100 is not supported by the supports 40. In the embodiment, the first state represents that the cover 20 is fully folded upon the main body 10. When the electronic device 100 is in a second state, part of the supporting members 60 of the supports 40 extend out of the receiving slots 15 via the through holes 155 to protrude beyond the bottom face 11. As such, the electronic device 100 is supported by the supports 40. To switch electronic device 100 from the first state to the second state, the cover 20 is rotated, the resisting portions 23 of the cover 20 resist and rotate the driving members 50. The driving members 50 rotate around the rotating shafts 157 and the protrusion 611 to slide the supporting members 60 along and out of the through holes 155. The elastic members 70 are compressed. As such, the supporting members 60 contact a supporting surface such as a table and support the electronic device 100. The main body 10 of the electronic device 100 is elevated and supported at an inclined angle by the supporting members 60. Consequently, a gap is formed between the bottom face 11 of the main body 10 and the surface. To return the electronic device 100 from the second state to the first state, the cover 20 is rotated back to release resistance on the driving members 50, and the elastic members 70 force the supporting members 60 of the supports 40 into the receiving slots 15 and the through holes 155. As such, the supports 40 are once again fully received inside the main body 10.

In the second state, wherein the supporting members 60 of the supports 40 have been impelled out of the bottom face 11 of the main body 10 by opening of the cover 20, the electronic device 100 is inclined at an angle such that the elevated side of the electronic device 100 is above a supporting surface such as the tabletop, making operation of a keyboard of the electronic device 100 more comfortable. In addition, heat can be quickly dispersed from the bottom face 11 through the gap between the main body 10 and the surface.

It may be appreciated that the electronic device 100 may include one or more supports 40. If the electronic device 100 includes a single support 40, the support 40 may be preferably positioned on a middle portion of the main body 10.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An electronic device, comprising: a main body defining at least one receiving slot; a cover hinged on the main body, and comprising at least one resisting portion; and at least one support each comprising a supporting member and a driving member hinged with the supporting member, wherein the driving member hinges on the main body, and the driving member is directly resisted and rotated by the at least one resisting portion of the cover, so that the supporting member of each of the at least one support is capable of being received in the at least one receiving slot or pushed out of the main body, in response of the positions of the cover; wherein each of the at least one support further comprises an elastic member positioned with opposite ends resisting the main body and the supporting member correspondingly; wherein the supporting member comprises a connecting portion, a limiting portion, and a supporting portion arranged in that order, wherein the limiting portion has a diameter larger than the supporting portion to resist an end of the elastic member, and the elastic member is sleeved on the supporting portion of the supporting member.

2. The electronic device of claim 1, wherein the main body comprises a bottom face to contact a surface on which the electronic device is supported, wherein the supporting member of each of the at least one support is pushed out of the bottom face of the main body.

3. The electronic device of claim 1, further comprising at least one pivot shaft to hinge the cover on the main body; wherein the main body forms a connecting portion, the connecting portion defines at least one shaft hole at ends receiving the at least one pivot shaft; and each resisting portion defines a pivot hole receiving a corresponding pivot shaft.

4. The electronic device of claim 1, wherein for each receiving slot, the main body comprises a bottom face and a side surface adjoining the bottom face, a bottom wall and a plurality of sidewalls adjoining the bottom wall cooperatively defines the receiving slot, one of the sidewalls defines a through hole communicating with the receiving slot and the bottom face; and the supporting member protrudes out of the main body via the through hole.

5. The electronic device of claim 4, wherein for each receiving slot, the main body comprises a rotating shaft, the rotating shaft comprises a first shaft portion and a second shaft portion, the first shaft portion has a diameter larger than that of the second shaft portion; and the driving member defines a shaft hole to rotatably sleeve on the second shaft portion.

6. The electronic device of claim 1, wherein the number of receiving slot is two, both defined on opposites end of a side of the main body; and the number of supports is two.

7. An electronic device, comprising: a main body defining at least one receiving slot; a cover hinged on the main body, the cover comprising at least one resisting portion; and at least one support slidably connected to the main body, each support comprising a supporting member and a driving member, when the cover is rotated relative to the main body, the at least one resisting portion directly resists and causes the driving member to rotate to force the supporting member out of the receiving slot, so that the main body is supported by the at least one support; wherein each of the at least one support further comprises an elastic member positioned with opposite ends resisting the main body and the supporting member correspondingly; wherein the supporting member comprises a connecting portion, a limiting portion, and a supporting portion arranged in order, the limiting portion has a diameter larger than that of the supporting portion to resist an end of the elastic member, and the elastic member is sleeved on the supporting portion of the supporting member.

8. The electronic device of claim 7, wherein the main body comprises a bottom face to contact a tabletop on which the electronic device is put, the supporting member of the at least one support protrudes out of the bottom face of the main body.

9. The electronic device of claim 7, further comprising two pivot shafts to hinge the cover on the main body; the main body forms a connecting portion, the connecting portion defines two shaft holes at two ends receiving the two pivot shafts, respectively; and the at least one resisting portion comprises two resisting portions, each defining a pivot hole receiving a corresponding pivot shaft.

10. The electronic device of claim 7, wherein for each receiving slot, the main body comprises a bottom face, and a side surface adjoining the bottom face, a bottom wall and a plurality of sidewalls adjoining the bottom wall cooperatively defines the receiving slot, one of the sidewalls defines a through hole communicating with the receiving slot and the bottom face; and the supporting member protrudes out of the main body via the through hole.

11. The electronic device of claim 10, wherein the at least one support comprises two supports, the at least one receiving slot comprises two receiving slots, and the at least one resisting portion comprises two resisting portions.

* * * * *